United States Patent
Viaux et al.

(10) Patent No.: US 10,926,807 B2
(45) Date of Patent: Feb. 23, 2021

(54) VEHICLE FRONT BODY STRUCTURE AND METHOD FOR MANUFACTURING THEREOF

(71) Applicant: ArcelorMittal, Luxembourg (LU)

(72) Inventors: Ivan Viaux, Paris (FR); Yves Drouadaine, Pontoise (FR)

(73) Assignee: ARCELORMITTAL, Luxembourg (LU)

( * ) Notice: Subject to any disclaimer, the term of this patent is extended or adjusted under 35 U.S.C. 154(b) by 0 days.

(21) Appl. No.: 15/780,522

(22) PCT Filed: Dec. 9, 2016

(86) PCT No.: PCT/EP2016/002078
§ 371 (c)(1),
(2) Date: May 31, 2018

(87) PCT Pub. No.: WO2017/097426
PCT Pub. Date: Jun. 15, 2017

(65) Prior Publication Data
US 2018/0354560 A1  Dec. 13, 2018

(51) Int. Cl.
*B62D 25/08* (2006.01)
*B62D 29/00* (2006.01)
(Continued)

(52) U.S. Cl.
CPC ......... *B62D 25/082* (2013.01); *B62D 21/152* (2013.01); *B62D 29/007* (2013.01); *B62D 25/16* (2013.01)

(58) Field of Classification Search
CPC .... B62D 21/152; B62D 25/08; B62D 25/082; B62D 25/085; B62D 29/007
(Continued)

(56) References Cited

U.S. PATENT DOCUMENTS 5,913,565 A    6/1999  Watanabe
6,406,088 B1*  6/2002  Tate .................... B62D 21/152
                                                    188/371
(Continued)

FOREIGN PATENT DOCUMENTS

CN       102390434 A    3/2012
JP        S49919 A      1/1974
(Continued)

OTHER PUBLICATIONS

The International Preliminary Report on Patentability issued in connection with International Application No. PCT/EP2016/002078 dated Mar. 16, 2018.
(Continued)

*Primary Examiner* — Dennis H Pedder
(74) *Attorney, Agent, or Firm* — Davidson, Davidson & Kappel, LLC (57) ABSTRACT

A vehicle front body structure containing an upper longitudinal beam and a upper fender rail for supporting a fender of the vehicle, said upper fender rail extending in a longitudinal direction substantially parallel to the upper longitudinal beam and having a front end and a rear end spaced apart along the longitudinal direction.
The resistance to plastic deformation of the upper fender rail increases from the front end of the upper fender rail to the rear end of the upper fender rail. The yield strength of the material of the rear section is greater than the yield strength of the material of the front section and/or the rear section has a greater wall thickness than the wall thickness of the front section.

18 Claims, 3 Drawing Sheets

(51) Int. Cl.
*B62D 21/15* (2006.01)
*B62D 25/16* (2006.01)

(58) Field of Classification Search
USPC ............ 296/203.01, 203.02, 193.09, 187.09, 296/187.1
See application file for complete search history.

(56) References Cited

U.S. PATENT DOCUMENTS

| | | | | |
|---|---|---|---|---|
| 6,416,119 | B1* | 7/2002 | Gericke | B62D 21/12 29/897.2 |
| 8,454,079 | B2* | 6/2013 | Yoshida | B21D 7/08 296/187.09 |
| 2003/0090127 | A1* | 5/2003 | Saeki | B62D 21/152 296/187.12 |
| 2004/0195862 | A1* | 10/2004 | Saeki | B62D 21/152 296/187.09 |
| 2009/0160217 | A1 | 6/2009 | Kimura et al. | |
| 2010/0096887 | A1 | 4/2010 | Mori | |
| 2012/0025548 | A1 | 2/2012 | Bodin | |
| 2018/0162452 | A1 | 6/2018 | Hirota | |

FOREIGN PATENT DOCUMENTS

| | | | |
|---|---|---|---|
| JP | 7228267 | A | 2/1994 |
| JP | H07228267 | A | 8/1995 |
| JP | 2001301656 | A | 10/2001 |
| JP | 2003146241 | A | 5/2003 |
| JP | 2006068796 | A | 3/2006 |
| JP | 2008207619 | A | 9/2008 |
| JP | 2008280609 | A | 11/2008 |
| JP | 2011158270 | A | 8/2011 |
| JP | 2012528752 | A | 11/2012 |
| JP | 2015016728 | A | 1/2015 |
| JP | 2015113025 | A | 6/2015 |
| JP | 2015196844 | A | 11/2015 |
| WO | 2008102262 | A1 | 8/2008 |
| WO | 2010126423 | A1 | 11/2010 |
| WO | WO2015004516 | A1 | 1/2015 |

OTHER PUBLICATIONS

The International Search Report issued in connection with International Application No. PCT/IB2015/002319 dated Aug. 9, 2016.
The International Search Report issued in connection with International Application No. PCT/EP2016/002078 dated Apr. 10, 2017.
Abstract of JP 7228267, Feb. 17, 1994.

* cited by examiner

VEHICLE FRONT BODY STRUCTURE AND METHOD FOR MANUFACTURING THEREOF

FIELD OF THE INVENTION

The present invention relates to a vehicle front body structure comprising an upper longitudinal beam and a upper fender rail for supporting a fender of the vehicle, said upper fender rail extending in a longitudinal direction substantially parallel to the upper longitudinal beam and having a front end and a rear end spaced apart along the longitudinal direction, the rear end being attached to a front pillar of the vehicle and the upper fender rail extending towards the front of the vehicle from the rear end.

BACKGROUND OF THE INVENTION

Conventionally, the front body structure of a vehicle is arranged to protect the vehicle occupants in case of a full frontal impact by limiting intrusions of any kind into the vehicle passenger compartment. To this end, the front body structure comprises, a front bumper connected to structural longitudinal beams through crash boxes.

While this arrangement can be efficient in case of a full front impact, i.e. an impact occurring in the longitudinal direction at the front of the vehicle in a substantially centered manner, a risk remains in case of a frontal impact, which is offset relative to the center of the vehicle, called "small overlap crash". During such a small overlap crash, only a small portion of the vehicle's front end, usually between 15% and 25%, strikes another vehicle or an object such as a pole or a tree.

In this situation the key crash absorbing structures mentioned above, which are located in the middle section of the front end of the vehicle, are more or less bypassed and the crash forces may go directly into the passenger compartment, thus posing an important risk of damage to the passenger compartment and its occupants.

During such a small overlap crash, the impact occurs in the longitudinal direction at the front of the vehicle outward of the longitudinal structural elements, i.e. on one side of the vehicle. For example, such an impact occurs when the vehicle strikes a pole or a tree on one side of said vehicle. In this case, the regular impact absorbing elements provided at the front of the vehicle do not fully fulfill their function since the impact does not occur in front of these elements.

BRIEF SUMMARY OF THE INVENTION

One of the objects of the invention is to provide a vehicle front body structure that has an improved crashworthiness, in particular in the event of a small overlap crash.

The invention provides a vehicle front end body comprising an upper longitudinal beam and a upper fender rail for supporting a fender of the vehicle, said upper fender rail extending in a longitudinal direction substantially parallel to the upper longitudinal beam and having a front end and a rear end spaced apart along the longitudinal direction, the rear end being attached to a front pillar of the vehicle and the upper fender rail extending towards the front of the vehicle from the rear end, wherein the resistance to plastic deformation of the upper fender rail increases from the front end of the upper fender rail to the rear end of the upper fender rail.

In certain embodiments, the product of the square of the wall thickness of the rear section by the yield strength of the rear section is greater than the product of the square of the wall thickness of the front section by the yield strength of the front section.

In certain embodiments, the rear section comprises a front subsection and a rear subsection, the resistance to plastic deformation of the rear subsection being greater than the resistance to plastic deformation of the front subsection.

In certain embodiments, the product of the square of the wall thickness of the rear subsection by the yield strength of the rear subsection is greater than the product of the square of the wall thickness of the front subsection by the yield strength of the front subsection.

In certain embodiments, the yield strength of the material of the rear subsection is greater than the yield strength of the material of the front subsection and/or the rear subsection has a wall thickness that is greater than the wall thickness of the front subsection.

In certain embodiments, the front section is made of DP590 steel, the front subsection is made of DP780 steel and the rear subsection is made of DP980 steel.

In certain embodiments, the front section is a press-hardened steel part having, after press-hardening, a yield strength comprised between 360 and 400 MPa, the front subsection of the rear section is a press-hardened steel part having, after press-hardening, a yield strength comprised between 700 and 950 MPa and the rear subsection of the rear section is a press-hardened steel part having, after press-hardening, a yield strength comprised between 950 and 1200 MPa.

In certain embodiments, the front section is made of a press-hardenable steel having a carbon content comprised between 0.04 wt. % and 0.1 wt. % and a manganese content comprised between 0.3 wt. % and 2.0 wt. %, the front subsection of the rear section is made of a press-hardenable steel having a carbon content comprised between 0.06 wt. % and 0.1 wt. % and a manganese content comprised between 1.4 wt. % and 1.9 wt. %, and the rear subsection of the rear section is made of a press-hardenable steel having a carbon content comprised between 0.20 wt. % and 0.25 wt. % and a manganese content comprised between 1.1 wt. % and 1.4 wt. %.

In certain embodiments, the front section is a press-hardened steel part having, after press-hardening, a yield strength Re greater or equal to 600 MPa and the rear section is a press-hardened steel part having, after press-hardening, a yield strength greater or equal to 850 MPa.

In certain embodiments, the upper fender rail is entirely made of a press-hardenable steel having, after press-hardening, a yield strength comprised between 700 and 950 MPa, the wall thickness of the upper fender rail increasing from the front end to the rear end thereof.

In certain embodiments, the upper fender rail is made of a press-hardenable steel having a carbon content comprised between 0.06 wt. % and 0.1 wt. % and a manganese content comprised between 1.4 wt. % and 1.9 wt. %.

In certain embodiments, the cross-sectional area of the front section is smaller than the cross-sectional area of the rear section.

In certain embodiments, the length of the front section is smaller than the length of the rear section.

In certain embodiments, the upper fender rail is a hollow tubular element.

In certain embodiments, the upper fender rail is formed by the assembly of at least an inner half shell and an outer half shell assembled together along a longitudinal plane.

In certain embodiments, the inner half shell and the outer half shell are obtained from tailor welded blanks.

In certain embodiments, the vehicle front body structure further comprises a linking element joining the upper fender rail and the upper longitudinal beam.

In certain embodiments, no crashbox is attached to the front end of the upper fender rail.

In certain embodiments, the vehicle front body structure further comprises a transversal beam forming a bumper beam, attached to a front end of the upper longitudinal beam.

The invention also provides a vehicle body comprising a front body structure as defined above. The front body structure may, e.g., comprise an upper longitudinal beam and a upper fender rail for supporting a fender of the vehicle, said upper fender rail extending in a longitudinal direction substantially parallel to the upper longitudinal beam and having a front end and a rear end spaced apart along the longitudinal direction, the rear end being attached to a front pillar of the vehicle and the upper fender rail extending towards the front of the vehicle from the rear end, wherein the resistance to plastic deformation of the upper fender rail increases from the front end of the upper fender rail to the rear end of the upper fender rail.

The invention further provides a method for manufacturing a vehicle front end body comprising an upper longitudinal beam and a upper fender rail for supporting a fender of the vehicle, said upper fender rail extending in a longitudinal direction substantially parallel to the upper longitudinal beam and having a front end and a rear end spaced apart along the longitudinal direction, the rear end being attached to a front pillar of the vehicle and the upper fender rail extending towards the front of the vehicle from the rear end, wherein the resistance to plastic deformation of the upper fender rail increases from the front end of the upper fender rail to the rear end of the upper fender rail, the method comprising a step of manufacturing an upper fender rail, said step comprising: manufacturing of an inner half shell and an outer half shell; and assembling together said inner half shell and said outer half shell along a longitudinal plane.

In certain embodiments, the step of manufacturing the inner half shell and the outer half shell comprises: providing a tailor welded blank, the tailor welded blank being obtained by welding together at least as many blanks as there are portions having different thicknesses and/or compositions in the half-shell, each of these blanks having a thickness and/or a composition depending on the desired properties of the corresponding portion of the upper fender rail; and forming this tailor welded blank into the desired shape.

BRIEF DESCRIPTION OF THE DRAWINGS

The invention will be better understood upon reading the following description, given only by way of example, and with reference to the appended drawings, in which.

DETAILED DESCRIPTION OF THE INVENTION

In the following description, the terms "inner", "outer", "front", "rear", "transversal", "longitudinal", "vertical" and "horizontal" are construed with reference to the usual orientation of the illustrated elements, parts or structures when assembled on a vehicle structure, the vehicle lying on a horizontal plane.

Figure 1:
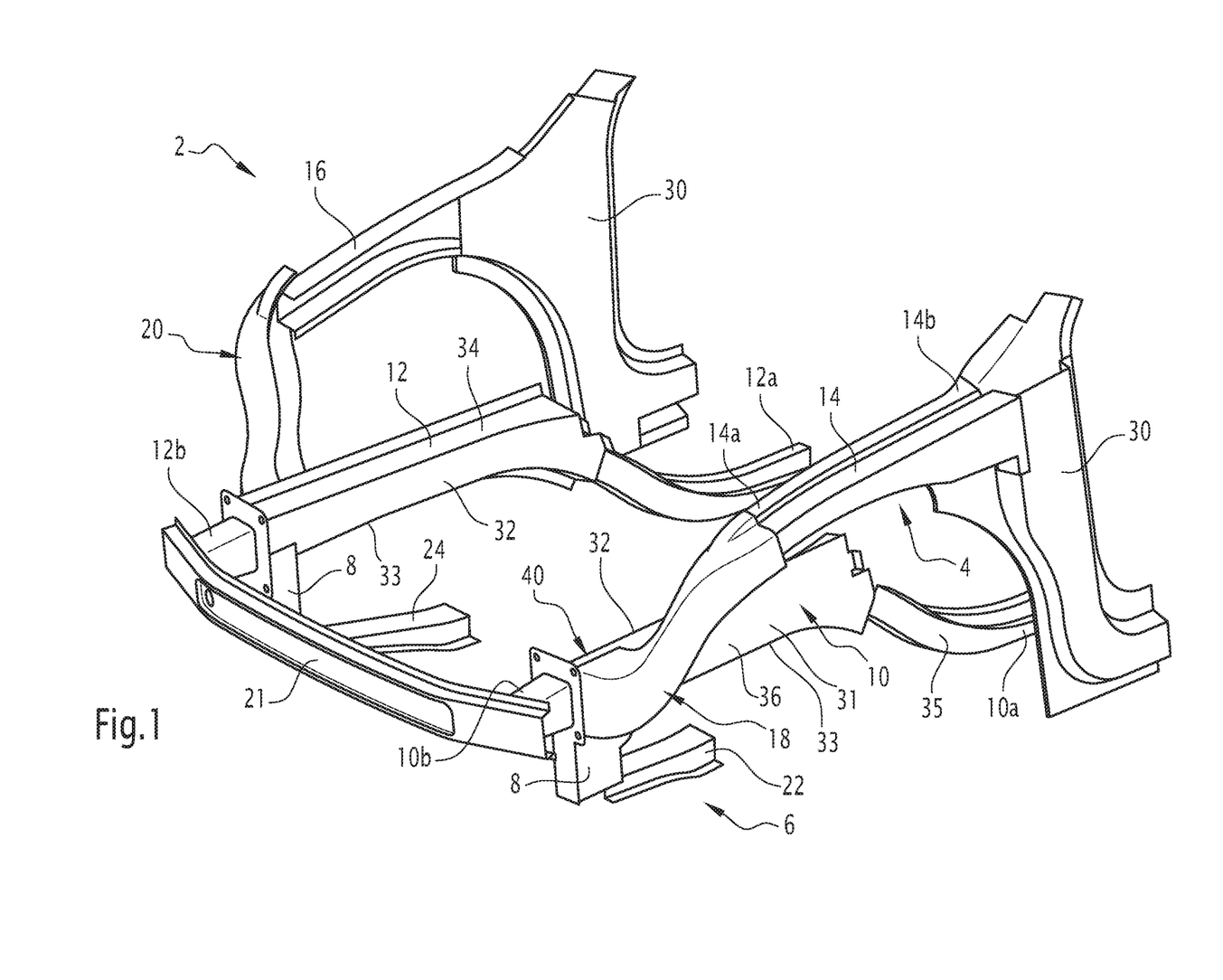
FIG. 1 is a perspective view of a vehicle front body structure according to a particular embodiment.

A vehicle front body structure 2 according to an embodiment is illustrated on FIG. 1. The vehicle front body structure 2 may be a front body structure of any kind of four wheel vehicle, in particular a front body structure of a unitized body.

The vehicle front body structure 2 comprises an upper frame assembly 4, a lower frame assembly 6, and connecting elements 8 for joining the upper frame assembly 4 and the lower frame assembly 6.

The upper frame assembly 4 comprises two upper longitudinal beams 10, 12, two upper fender rails elements 14, 16, and two linking elements 18, 20, each joining an upper fender rail 14, 16 to an upper longitudinal beam 10, 12. The upper frame assembly 4 further comprises a transversal beam 21, forming a bumper.

The lower frame assembly 6 comprises two lower longitudinal beams 22, 24. The lower longitudinal beams 22, 24 are for example cradle extensions.

The upper longitudinal beams 10, 12, the upper fender rails 14, 16 and the linking elements 18, 20 are all provided as pairs in left-right symmetry with respect to the lateral direction. In the following, the description will be made with reference to the left side elements or beams, on the understanding that the same description applies to the right side elements or beams.

The upper longitudinal beam 10 extends on one side of the vehicle in a front-rear direction of the vehicle body.

The upper longitudinal beam 10 extends between a rear end 10a and a front end 10b. Similarly, the upper longitudinal beam 12 extends between a rear end 12a and a front end 12b.

The rear end 10a is fixed to a portion of the vehicle structure, for example the front pillar 30, or other body structure fixed to the front pillar. Such a connection allows impact energy to be transferred through the longitudinal beam 10 to the remainder of the vehicle.

The transversal beam 21 extends in a substantially transversal direction between the upper longitudinal beams 10 and 12. The transversal beam 21 is attached to the front ends 10b, 12b of the upper longitudinal beams 10 and 12.

The upper longitudinal beam 10 comprises an outer flank 31, oriented towards the exterior of the vehicle, and an inner flank 32, parallel to the outer flank 31, oriented towards the interior of the vehicle. The upper longitudinal beam 10 further comprises a lower flank 33 oriented towards the bottom of the vehicle and an upper flank 34 oriented towards the top of the vehicle, the lower and upper flanks 33, 34 being substantially orthogonal to the inner and outer flanks 31, 32.

The upper longitudinal beam 10 comprises, from the rear end 10a to the front end 10b, a curved rear part 35 extending upward towards the front of the vehicle and a substantially horizontal front part 36.

The upper longitudinal beam 10 is for example made of a deformable material, for example a Dual Phase or a TRIP steel (TRansformation Induced Plasticity), preferably having a tensile strength higher than or equal to 600 MPa, or a high strength low alloy (so called HSLA) steel.

In particular, the upper longitudinal beam 10 may deform by bundling, i.e. by folding in on itself like a plastics bottle, when subjected to compressive stress resulting from an impact.

The upper longitudinal beam 10 may comprise crumple zones to allow the upper longitudinal beam 10 to controllably deform during an impact. The crumple zones may include, for example, apertures or cavities formed on the surface of the portions.

The upper fender rail 14 extends in a longitudinal direction substantially parallel to the upper longitudinal beam 10, at the outside, laterally, of the upper longitudinal beam 10, and above the upper longitudinal beam 10.

The upper fender rail 14, also called "shotgun rail", is intended for supporting the fender of the vehicle.

The upper fender rail 14 extends substantially above the front wheel casing of the vehicle body, and reinforces the wheel casing.

The upper fender rail 14 has a front end 14a and a rear end 14b.

The rear end 14b is fixed to a portion of the vehicle structure. It is for example fixed directly to the front pillar 30. It may also be connected indirectly to the front pillar 30 by being fixed to another body structure fixed to the front pillar 30. This connection of the upper fender rail 14 to the vehicle structure allows the impact energy to be transferred through the upper fender rail 14 to the remainder of the vehicle.

The upper fender rail 14 extends towards the front of the vehicle from the rear end 14b.

In the example shown in FIG. 1, the front end 14a of the upper fender rail 14 is fixed to a portion of the front end of the vehicle, and in particular to the upper longitudinal beam 10, in particular through the linking element 18, which extends between the front end 14a of the upper fender rail 14 and the upper longitudinal beam 10.

Preferably, and as can be seen in FIG. 1, no crashbox is attached to the front end 14a of the upper fender rail 14.

Preferably, part of or the whole upper fender rail 14 has a tubular shape, with a hollow closed cross-section.

Figure 2:
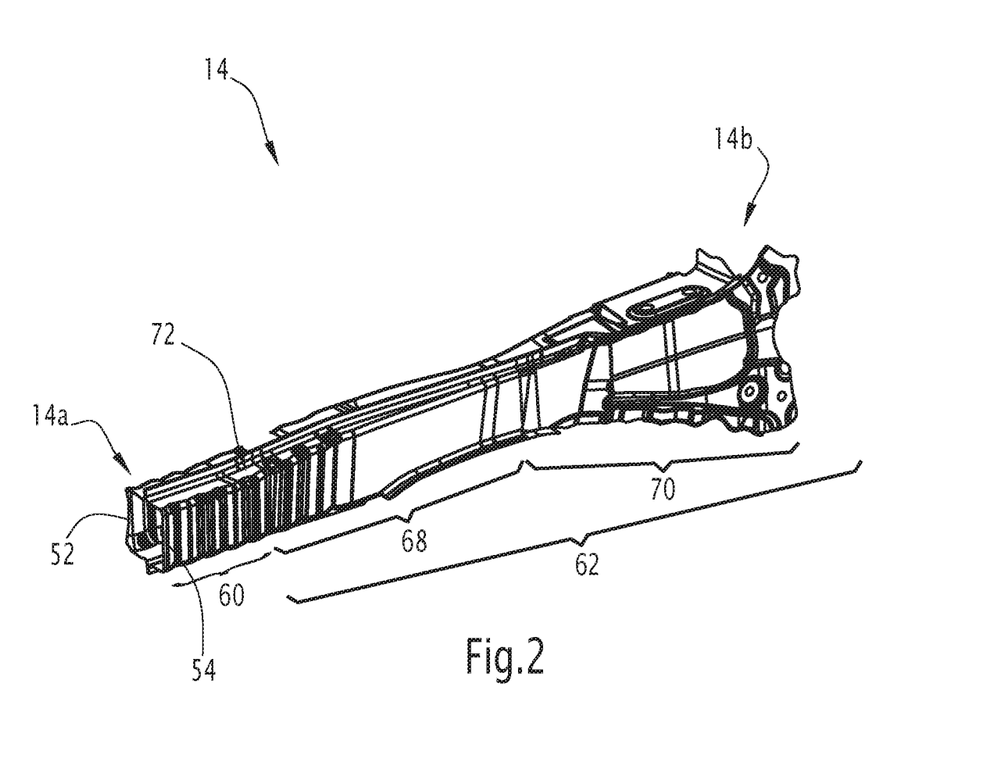
FIG. 2 is a perspective view of an upper fender rail according to an embodiment of the invention.

As shown in FIG. 2, it is for example formed by the assembly of two half shells 52, 54 assembled together along a longitudinal plane so that they form a closed cross-section. For example, the upper fender rail 14 comprises an outer U-shaped half shell 52, forming the outer wall of the upper fender rail 14 and an inner U-shaped half-shell 54 forming the inner wall of the upper fender rail 14. The two half shells 52, 54 are assembled together through welding, and in particular through spot welding.

The upper fender rail 14 is made of steel, and preferably of advanced high strength steel (AHSS), and more particularly of dual-phase steel.

According to the invention, the resistance to plastic deformation of the upper fender rail 14 increases from the front end 14a to the rear end 14b.

This increase in resistance may be a stepwise increase between different sections of the upper fender rail 14, taken along the longitudinal direction of the upper fender rail 14.

Figure 3:
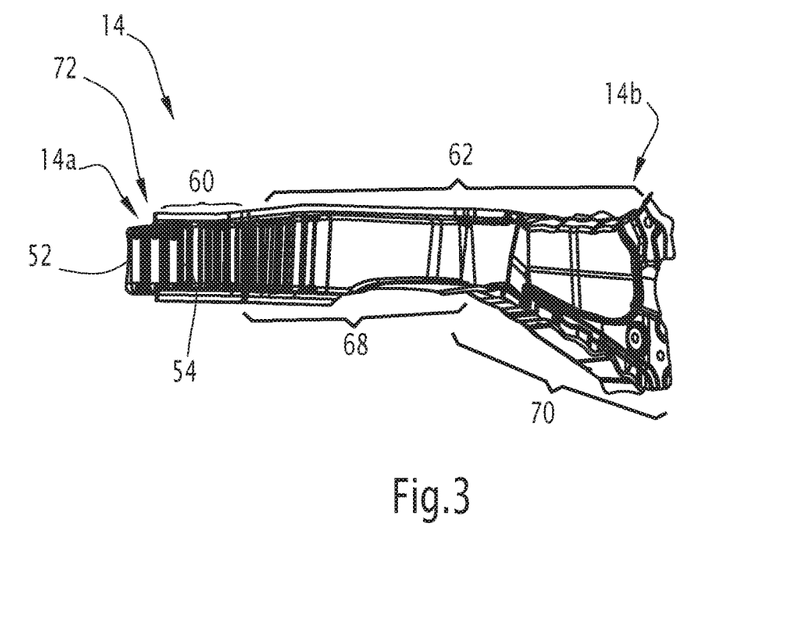
FIG. 3 is a perspective view of the upper fender rail of FIG. 2 viewed from the outer side.
Figure 4:
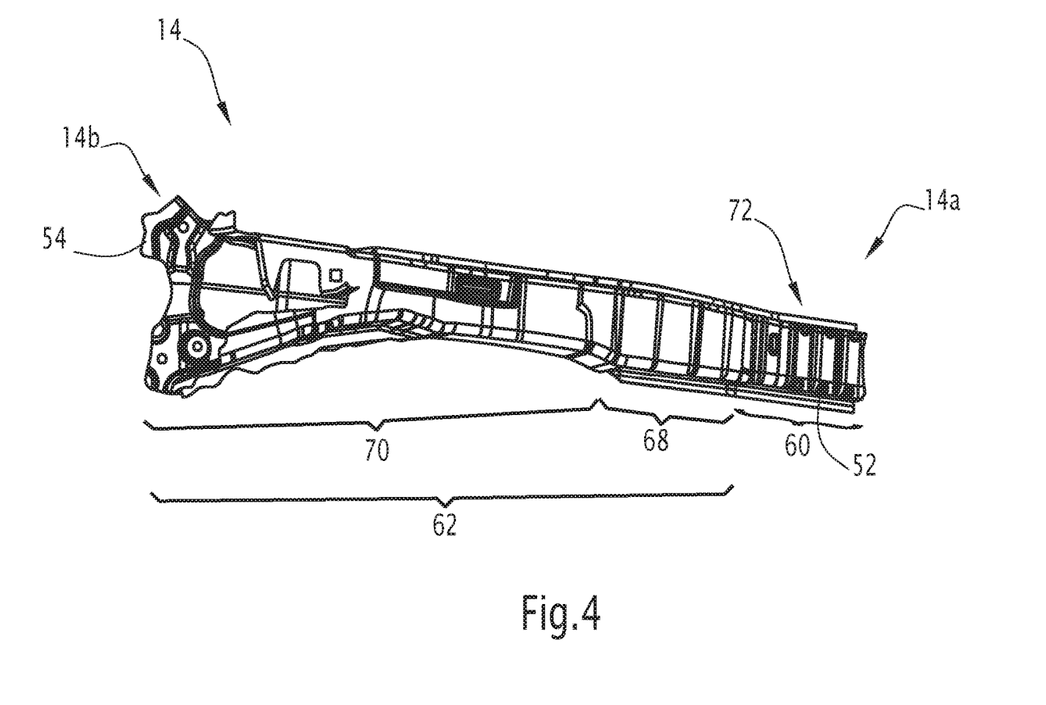
FIG. 4 is a perspective view of the upper fender rail of FIG. 2 viewed from the inner side.

More particularly, in the embodiment illustrated in FIGS. 2 to 4, the upper fender rail 14 comprises a front section 60 and a rear section 62, adjacent to one another along the longitudinal direction. The front section 60 extends from the front end 14a of the upper fender rail 14. The rear section 62 extends to the rear end 14b of the upper fender rail 14.

The resistance to plastic deformation of the rear section 62 is greater than the resistance to plastic deformation of the front section 60.

The resistance to plastic deformation increases with increasing wall thickness t of the considered upper fender portion, as well as with increasing yield strength of the material forming said upper fender portion.

The resistance to plastic deformation of each section of the upper fender rail 14 may be characterized by the product P of the square of the wall thickness t of the considered section of the fender rail 14 by the yield strength Re of said section.

According to the invention, this product P increases from the front end 14a to the rear end 14b of the upper fender rail 14.

More particularly, the product Pr for the rear section 62 is greater than the product Pf of the front section 60.

Advantageously, the yield strength Re of the material forming the upper fender rail 14 increases from the front end 14a to the rear end 14b of the upper fender rail 14.

Preferably, the yield strength Rer of the material forming the rear section 62 is greater than the yield strength Ref of the material forming the front section 60. Thus, Rer>Ref.

For example, the yield strength Ref of the steel forming the front section 60 may be comprised between 260 and 1000 MPa, while the yield strength Rer of the steel forming the rear section 62 is comprised between 600 and 2000 MPa.

In particular, the yield strength Re of the material forming the rear section 62 is greater by at least 100 MPa than the yield strength of the material forming the front section 60.

In this case, the increase of the resistance to plastic deformation from the front end 14a to the rear end 14b of the upper fender rail 14 is obtained through the increase of the yield strength between the different sections of the upper fender rail 14.

As an alternative, the wall thickness t of the upper fender rail 14 increases from the front end 14a of the upper fender rail 14 to the rear end 14b thereof.

More particularly, the wall thickness tr of the rear section 62 is greater than the wall thickness tf of the front section 60. In other words, tr>tf.

In this case, the increase of the resistance to plastic deformation from the front end 14a to the rear end 14b of the upper fender rail 14 is obtained through the increase of the wall thickness t between the different sections of the upper fender rail 14.

For example, the thickness tf of the wall of the front section 60 may be comprised between 0.6 and 1 mm, while the thickness tr of the wall of the rear section 62 is comprised between 0.8 and 2.2 mm.

In particular, the wall thickness tr of the rear section 62 is greater by at least 0.2 mm than the wall thickness tf of the front section 60.

Advantageously, both the yield strength Re and the wall thickness t of the upper fender rail 14 increase from the front end 14a to the rear end 14b.

More particularly, in the embodiment shown in the figures, where the upper fender rail 14 comprises a front and a rear section 62, the following relationships may apply: tr>tf and Rer>Ref.

The increase in the resistance to plastic deformation along the length of the upper fender rail 14 from its front end 14a to its rear end 14b is advantageous.

Indeed, the mechanical properties of the upper fender rail 14 can thus be tailored in such a way that, during a full frontal crash, where part of the crash energy is absorbed by the transversal beam 21 and the upper longitudinal beams 10, 12, only a front end portion of the upper fender rail 14 is deformed plastically and absorbs a significant amount of energy before fracture, while the more resistant rear section will stay substantially intact, therefore limiting the deceleration of the vehicle and damage on the passenger.

On the contrary, in case of a small overlap crash on one side of the vehicle, most of the impact energy is directed to the parts of the front end body located laterally exteriorly to the relevant longitudinal beam 10, 12, and in particular to the upper fender rail 14. In this situation, thanks to the particular structure of the fender rail 14, both the front and the rear section 60, 62 will be able to plastically deform and absorb energy, thus preventing an intrusion into the passenger compartment. Therefore, the passenger compartment will be well protected against an intrusion of the front end of the vehicle even in the case of a small overlap impact.

In the embodiment illustrated in FIG. 2, the rear section 62 of the upper fender rail 14 comprises a front subsection 68 and a rear subsection 70. These subsections 68, 70 are adjacent along the longitudinal direction, the front subsection 68 being located in front of the rear subsection 70 along the longitudinal direction.

In this embodiment, the resistance to plastic deformation of the rear subsection 70 is greater than the resistance to plastic deformation of the front subsection 68.

More particularly, the product P of the square of the wall thickness t of the rear subsection 70 by the yield strength Re of the rear subsection 70 is strictly greater than the product P of the square of the wall thickness t of the front subsection 68 by the yield strength Re of the front subsection 68. Since the product P of the rear section 62 is greater than of the product P of the front section 60, the product P of the front subsection 68 of the rear section 62 is also greater than the product P of the front section 60.

According to one example, the yield strength of the material of the rear subsection 70 is greater than the yield strength of the material of the front subsection 68 and/or the thickness of the rear subsection 70 is greater than the thickness of the front subsection 68. Advantageously, the yield strength and/or the thickness of the front subsection 68 of the rear section 62 are also greater than the yield strength and/or the thickness of the front section 60.

Preferably, both the yield strength and the thickness of the rear subsection 70 are greater than those of the front subsection 68. Advantageously, both the yield strength and the thickness of the front subsection 68 of the rear section 62 are also greater than the yield strength and the thickness of the front section 60.

For example, the yield strength Re of the material forming the front subsection 68 is greater by at least 100 MPa than the yield strength of the material forming the front section 60.

Providing an upper fender rail 14 having at least three adjacent sections with increasing resistance to plastic deformation from the front end 14a to the rear end 14b is advantageous. Indeed, it allows for a better control of the deceleration of the vehicle in the event of a full frontal crash.

According to one example, the front section 60 of the upper fender rail 14 is made entirely of one material having a given yield strength. It further has a constant thickness over its entire length. In this embodiment, the rear section 62 comprises a front subsection 68 and a rear subsection 70 which are made of materials having different yield strengths and/or thicknesses.

According to another example, the outer half shell 52 and the inner half shell 54 of the fender rail 14 each comprise a first portion forming a part of the front section 60 and a second portion forming a part of the rear section 62, the second portion in particular comprising a first sub-portion forming a part of the front subsection 68 and a second sub-portion forming a part of the rear subsection 70.

For example, the wall thickness of the outer half shell 52 and/or of the inner half shell 54 increases from the front end to the rear end thereof such that the resistance to plastic deformation increases from the front end 14a to the rear end 14b of the fender rail 14.

In particular, for the outer half shell 52 and/or for the inner half shell 54, the wall thickness of the second portion is greater than the wall thickness of the first portion. If the second portion of the outer half shell 52 and/or of the inner half shell 54 includes a first sub-portion and a second sub-portion, the wall thickness of the second sub-portion is advantageously greater than the wall thickness of the first sub-portion.

More particularly, according to one example, the front section 60 is made of DP590, able to be cold formed, which has a yield strength Re of about 350 MPa. The front subsection 68 of the rear section 62 is made of DP780, able to be cold-formed, which has a yield strength Re of about 490 MPa. The rear subsection 70 of the rear section 62 is made of DP980, able to be cold formed, which has a yield strength Re of about 710 MPa.

According to this example, the front section 60 for example has a wall thickness of 0.6 mm. The front subsection 68 for example has a wall thickness of 1.0 mm or greater than 1.0 mm, and for example equal to 1.3 mm. The rear subsection 70 has a wall thickness at least equal to 1.3 mm, and for example equal to 1.4 mm or to 1.6 mm.

More particularly, in this example, the upper fender rail 14 may be made of two shells 52, 54 and the portion of the inner shell 52 corresponding to the front subsection 68 may have a wall thickness of 1.3 mm, while the portion of the outer shell 54 corresponding to the front subsection 68 has a wall thickness of 1.0 mm. In this example, the portion of the inner shell 52 corresponding to the rear subsection 70 may have a wall thickness of 1.6 mm, while the portion of the outer shell 54 corresponding to the rear subsection 70 has a wall thickness of 1.4 mm.

According to another example, the front section 60 is a press-hardened steel part having, after press-hardening, a yield strength Re greater or equal to 600 MPa. The rear section 62 is a press-hardened steel part having, after press-hardening, a yield strength greater or equal to 850 MPa.

According to a third example, the front section 60 is a press-hardened steel part having, after press-hardening, a yield strength Re comprised between 360 and 400 MPa, the front subsection 68 of the rear section 62 is a press-hardened steel part having, after press-hardening, a yield strength Re comprised between 700 and 950 MPa and the rear subsection 70 of the rear section 62 is a press-hardened steel part having, after press-hardening, a yield strength Re comprised between 950 and 1200 MPa.

More particularly, in the third example:
the front section 60 is made of a press-hardenable steel having a carbon content comprised between 0.04 wt. % and 0.1 wt. % and a manganese content comprised between 0.3 wt. % and 2.0 wt. %,
the front subsection 68 of the rear section 62 is made of a press-hardenable steel having a carbon content comprised between 0.06 wt. % and 0.1 wt. % and a manganese content comprised between 1.4 wt. % and 1.9 wt. %, and
the rear subsection 70 of the rear section 62 is made of a press-hardenable steel having a carbon content comprised between 0.20 wt. % and 0.25 wt. % and a manganese content comprised between 1.1 wt. % and 1.4 wt. %.

Even more particularly, in the third example,
the steel composition of the front section 60 comprises in % weight: 0.04%≤C≤0.1%, 0.3%≤Mn≤2.0%, Si≤0.3%, Ti≤0.08%, 0.015≤Nb≤0.10%, Cu, Ni, Cr, Mo≤0.1%, the remainder being iron and unavoidable impurities resulting from the elaboration;

the steel composition of the front subsection 68 may further comprise Nb, Ti, B as alloying elements; and the steel composition of the rear subsection 70 of the rear section 62 comprises in % weight: 0.20%≤C≤0.25%, 1.1%≤Mn≤1.4%, 0.15%≤Si≤0.35%, ≤Cr≤0.30%, 0.020%≤Ti≤0.060%, 0.020%≤Al≤0.060%, S≤0.005%, P≤0.025%, 0.002%≤B≤0.004%, the remainder being iron and unavoidable impurities resulting from the elaboration.

This combination of features of the front section 60 and the rear section 62 allows achieving a very good behavior both in the case of a full frontal crash and in the case of a small overlap crash.

According to a fourth example, the upper fender rail 14 is made entirely of one steel and has a wall thickness which increases from the front end 14a to the rear end 14b thereof.

For example, the upper fender rail 14 is made entirely of a press-hardened steel and forms a press-hardened steel part having, after press-hardening, a yield strength Re comprised between 700 and 950 MPa.

More particularly, in the fourth example, the upper fender rail 14 is made of a press-hardenable steel having a carbon content comprised between 0.06 wt. % and 0.1 wt. % and a manganese content comprised between 1.4 wt. % and 1.9 wt. %.

Even more particularly, this press-hardenable steel comprises, in weight, between 0.02 and 0.1% of chromium, between 0.04% and 0.06% of niobium, between 3.4×N and 8×N of titanium, N being the nitrogen content of the steel, and between 0.0005 and 0.004% of boron. This steel composition makes it possible to achieve an excellent combination of strength and ductility of the press hardened part.

Even more particularly, in this example, the front section 60 for example has a wall thickness of 0.8 mm. The front subsection 68 of the rear section 62 may have a wall thickness greater than or equal to 0.9 mm and the rear subsection 70 of the rear section 62 may have a wall thickness greater than or equal to 1.0 mm.

More particularly, in this example, the upper fender rail 14 may be made of two shells 52, 54 and the first sub-portion of the inner shell 52, forming a part of the front subsection 68 has a wall thickness of 1.0 mm, while the first sub-portion of the outer shell 54, forming a part of the front subsection 68 has a wall thickness of 0.9 mm. In this example, the second sub-portion of the inner shell 52 forming a part of the rear subsection 70 may have a wall thickness of 1.2 mm, while the second sub-portion of the outer shell 54, forming a part of the rear subsection 70, has a wall thickness of 1.0 mm.

This structure is particularly advantageous, as it provides a very good crash management performance for a limited weight.

As shown in FIGS. 2 to 4, the upper fender rail 14 may comprise crumple zones 72 to allow the upper fender rail 14 to controllably deform during an impact.

The crumple zones 72 may include, for example, apertures, cavities or ribs formed on the walls of the upper fender rail 14.

In the embodiment shown in FIGS. 2 to 4, the crumple zones 72 are formed by ribs formed in the wall of the upper fender rail 14. The ribs extend transversely to the longitudinal direction, i.e. substantially vertically. They are substantially parallel to one another. In this example they are spaced regularly along the longitudinal direction and present a uniform width along the longitudinal direction. Each rib extends from the top to the bottom of the upper fender rail 14.

In the embodiment shown in FIGS. 2 to 4, the crumple zones 72 are formed in the front section 60 of the upper fender rail 14. In this embodiment, the rear section 62 also includes crumple zones 72 at its front end, and more particularly in its front subsection 68. The crumple zones 72 at the front of the rear section 62 extend in the continuation of the crumple zones 72 in the front section 60. In this example, the crumple zones 72 extend over only a portion of the front subsection 68 along the longitudinal direction. The rear end of the rear section 62, and in particular the rear subsection 70, does not include any crumple zones.

In the example shown in FIG. 2, the cross-sectional area of the upper fender rail 14 increases from the front end 14a to the rear end 14b thereof. The cross-sectional area is the area of the upper fender rail 14 taken in a plane normal to the longitudinal direction. This feature also contributes to increasing the resistance to deformation from the front end 14a to the rear end 14b of the upper fender rail 14.

More particularly, in the example shown in FIG. 2, this increase of the cross-sectional area is obtained through an increase of the height of the upper fender rail 14, the width staying substantially constant along the length of the upper fender rail 14.

According to one embodiment, the length of the front section 60 is smaller than the length of the rear section 62, and more particularly smaller than the length of the front subsection 68 and of the rear subsection 70 of the rear section 62. By way of example, the length of the front section 60 is less than one quarter of the length of the rear section 62. The length of the rear subsection 70 is for example greater than the length of the front subsection 68. It is for example 15% longer than the front subsection 68.

In the embodiment shown in the figures, the length of the front section 60 is substantially the same on the inside and on the outside of the upper fender rail 14.

In the rear section 62, the front subsection 68 is shorter on the inside of the upper fender rail than on the outside. Its length is in particular shorter by at least 50% on the inside than on the outside of the upper fender rail 14. The length of the rear subsection 70, for its part, is greater on the inside of the upper fender rail 14 than on the outside. Therefore, on part of its length, the inner wall of the rear subsection 70, i.e. the wall facing towards the interior of the vehicle, extends facing the outer wall, i.e. the wall facing towards the exterior of the vehicle, of the front subsection 68.

According to one example, on the outer wall side of the upper fender rail 14, the front section 60 has a length of 135 mm, the front subsection 68 has a length of 345 mm and the rear subsection 70 has a length of 372 mm. On the inner wall side of the upper fender rail 14, the front section 60 has a length of 133 mm, the front subsection 68 has a length of 162 mm and the rear subsection 70 has a length of 511 mm.

Advantageously, the inner half shell 52 and the outer half shell 54 are each manufactured from a corresponding tailor welded blank, the tailor welded blank being obtained by welding, and in particular laser welding, together as many different blanks as there are sections in the upper fender rail 14, each of these blanks having a thickness and/or a composition depending on the desired properties of the corresponding upper fender rail section.

At least two adjacent sections of the upper fender rail 14 are connected to each other through a weld. According to one embodiment, all three sections of the upper fender rail 14 are connected to each other through a weld.

A method for manufacturing each half-shell 52, 54 will now be explained.

Advantageously, each half-shell 52, 54 is manufactured from a corresponding tailor welded blank, the tailor welded blank being obtained by welding, and in particular laser welding, of at least as many different blanks as there are portions having different compositions or thicknesses in the half-shell 52, each of these blanks having a composition and/or thickness depending on the desired properties of the corresponding half-shell 52, 54 portion.

More particularly, a method for manufacturing an upper fender rail 14 comprises the following successive steps:
- welding together, in particular through laser welding, of at least as many different blanks as there are portions having different compositions or thicknesses in the half-shell 52, each of these blanks having a composition and/or thickness depending on the desired properties of the corresponding half-shell 52, 54 portion;
- forming this tailor welded blank into the desired shape, in particular through stamping.

Depending on the steel used for each of the sections, the blanks are hot formed or cold formed, and in particular hot stamped or cold stamped in order to obtain the half shells 52, 54.

Depending on the desired final properties of each section of the upper fender rail 14, these sections may be subjected to a different heat treatment during or after forming the blank into the half-shell 52, 54.

For example, if two adjacent sections have the same composition, but are intended to have different yield strengths in the final part, these different yield strengths may be obtained by one or a combination of the following methods:
- during hot forming, the section intended to have a lower yield strength is heated to a lower temperature than the section intended to have a higher yield strength;
- after hot forming, the section intended to have a lower yield strength is cooled at a slower rate than the section intended to have a higher yield strength; and/or
- the sections are subjected to an identical hot forming and cooling after hot forming treatment, but the section intended to have a lower yield strength is subsequently subjected to an additional heat treatment in order to decrease its yield strength.

The half shells 52, 54 are then assembled to form the upper fender rail 14.

In the example shown in FIG. 1, the front part 36 of the upper longitudinal beam 10 includes an attachment portion 40 for attaching the linking element 18.

While the invention has been described in detail in connection with only a limited number of embodiments, it should be readily understood that the invention is not limited to such disclosed embodiments.

For example, even if only the upper and lower longitudinal beams, the reinforcing elements, the connecting elements and the lower transversal beam were described and illustrated, the vehicle front body structures may comprise several other beams or elements.

Moreover, in the example illustrated in FIG. 1, the front end 14a of the fender rail 14 is connected to the upper longitudinal beam 10 through the linking element 18. Alternatively, the front end 14a of the fender rail 14 may not be connected to any element of the vehicle's front body structure 2.

What is claimed is:

1. A vehicle front body structure comprising an upper longitudinal beam and a upper fender rail for supporting a fender of the vehicle, said upper fender rail extending in a longitudinal direction substantially parallel to the upper longitudinal beam and having a front end and a rear end spaced apart along the longitudinal direction, the rear end being attached to a front pillar of the vehicle and the upper fender rail extending towards the front of the vehicle from the rear end,
    wherein the resistance to plastic deformation of the upper fender rail increases from the front end of the upper fender rail to the rear end of the upper fender rail, said upper fender rail comprising a front section and a rear section, the resistance to plastic deformation of the rear section being greater than the resistance to plastic deformation of the front section, and
    wherein the yield strength of the material of the rear section is greater than the yield strength of the material of the front section,
    wherein the front section is a press-hardened steel part having, after press-hardening, a yield strength $R_e$ greater or equal to 600 MPa and the rear section is a press-hardened steel part having, after press-hardening, a yield strength greater or equal to 850 MPa.

2. The vehicle front body structure according to claim 1, wherein the product of the square of the wall thickness of the rear section by the yield strength of the rear section is greater than the product of the square of the wall thickness of the front section by the yield strength of the front section.

3. The vehicle front body structure according to claim 1, wherein the rear section comprises a front subsection and a rear subsection, the resistance to plastic deformation of the rear subsection being greater than the resistance to plastic deformation of the front subsection.

4. The vehicle front body structure according to claim 3, wherein the product of the square of the wall thickness of the rear subsection by the yield strength of the rear subsection is greater than the product of the square of the wall thickness of the front subsection by the yield strength of the front subsection.

5. The vehicle front body structure according to claim 3, wherein the yield strength of the material of the rear subsection is greater than the yield strength of the material of the front subsection.

6. The vehicle front body structure according to claim 1, wherein the upper fender rail is entirely made of a press-hardenable steel having, after press-hardening, a yield strength comprised between 700 and 950 MPa, the wall thickness of the upper fender rail increasing from the front end to the rear end thereof.

7. The vehicle front body structure according to claim 6, wherein the upper fender rail is made of a press-hardenable steel having a carbon content comprised between 0.06 wt. % and 0.1 wt. % and a manganese content comprised between 1.4 wt. % and 1.9 wt. %.

8. The vehicle front body structure according to claim 1, wherein the cross-sectional area of the front section is smaller than the cross-sectional area of the rear section.

9. The vehicle front body structure according to claim 1, wherein the length of the front section is smaller than the length of the rear section.

10. The vehicle front body structure according to claim 1, wherein the upper fender rail is a hollow tubular element.

11. The vehicle front body structure according to claim 10, wherein the upper fender rail is formed by the assembly of at least an inner half shell and an outer half shell assembled together along a longitudinal plane.

12. The vehicle front body structure according to claim 11, wherein the inner half shell and the outer half shell are obtained from tailor welded blanks.

13. The vehicle front body structure according to claim 1, further comprising a linking element joining the upper fender rail and the upper longitudinal beam.

14. The vehicle front body structure according to claim 1, wherein no crashbox is attached to the front end of the upper fender rail.

15. The vehicle front body structure according to claim 1, further comprising a transversal beam forming a bumper beam, attached to a front end of the upper longitudinal beam.

16. A vehicle body comprising:
   a fender; and
   the vehicle front body structure according to claim 1 supporting the fender.

17. A method for manufacturing the vehicle front body structure according to claim 1, comprising a step of manufacturing the upper fender rail, said step comprising:
   manufacturing of an inner half shell and an outer half shell;
   assembling together said inner half shell and said outer half shell along a longitudinal plane.

18. The method according to claim 17, wherein the step of manufacturing the inner half shell and the outer half shell comprises:
   providing a tailor welded blank, the tailor welded blank being obtained by welding together at least as many blanks as there are portions having different thicknesses and/or compositions in the half-shell, each of these blanks having a thickness and/or a composition depending on the desired properties of the corresponding portion of the upper fender rail; and
   forming this tailor welded blank into the desired shape.

* * * * *